United States Patent [19]

Tatami

[11] Patent Number: 4,864,387
[45] Date of Patent: Sep. 5, 1989

[54] PAL VIDEO TIME BASE CORRECTOR INVERTS COLOR DIFFERENCE SIGNAL (V) AXIS

[75] Inventor: Mitsushige Tatami, Kanagawa, Japan

[73] Assignee: Sony Corporation, Tokyo, Japan

[21] Appl. No.: 179,388

[22] Filed: Apr. 8, 1988

[30] Foreign Application Priority Data

Apr. 10, 1987 [JP] Japan .................................. 62-89561
Apr. 17, 1987 [JP] Japan .................................. 62-94792

[51] Int. Cl.$^4$ .............................................. H04N 9/89
[52] U.S. Cl. ........................................ 358/19; 358/326
[58] Field of Search ........................... 358/13, 19, 326

[56] References Cited

U.S. PATENT DOCUMENTS 4,145,705  3/1979  Yoshinaka ............................. 358/19
4,506,286  3/1985  Kashiyi ................................. 358/13
4,729,013  3/1988  Tatami et al. ......................... 358/19

FOREIGN PATENT DOCUMENTS

28289   2/1986  Japan .
14189   7/1986  Japan .
2157118 10/1985  United Kingdom ................ 358/326

Primary Examiner—John W. Shepperd
Attorney, Agent, or Firm—Lewis H. Eslinger; Jay H. Maioli

[57] ABSTRACT

A time base corrector converts an analog input PAL image signal including a certain time base error to digital form and then stores it in a memory by using a write clock signal derived from the input PAL image signal including the time base error. The stored signal is read out from the memory by a reference readout clock signal to eliminate the time base error, and a reference color burst signal is added to it. The time base corrector extracts a color subcarrier signal from the input PAL image signal, samples the color subcarrier signal by using a first clock signal in a manner such that U-axis data and V-axis data of the color subcarrier signal are generated independently of each other, compares the polarity of the V-axis data of the color burst of the sampled color subcarrier signal with the polarity of the V-axis data of the reference color burst signal, and selectively inverts the polarity of the V-axis data of the color burst of the sampled color subcarrier signal on the basis of the comparison result.

5 Claims, 6 Drawing Sheets

FIG. 4A (First Line)
FIG. 4B (Second Line)
FIG. 4C (Third Line)
FIG. 4D (Fourth Line)

FIG. 5A
(Sampling Phase Coincident With V-Axis)

FIG. 5B
(Sampling Phase Leads V-Axis by $\alpha°$)

FIG. 5C
(Sampling Phase Lags V-Axis by $\beta°$)

PAL VIDEO TIME BASE CORRECTOR INVERTS COLOR DIFFERENCE SIGNAL (V) AXIS

BACKGROUND OF THE INVENTION

1. Field of the Invention

This invention relates to a time base corrector for correcting the time base error of a PAL color image signal.

2. Description of the Prior Art

A time base corrector (hereinafter sometimes referred to simply as a "TBC") as described in U.S. Pat. No. 4,258,384 is already known as means for correcting the time base error of an image signal reproduced by a video tape recorder (VTR). The disclosure of this patent is incorporated herein by reference.

Conventionally, the TBC adds a color burst signal of a reference color image signal to a color image signal whose time base error has been corrected.

The V-axis signal component of the color subcarrier signal of the PAL image signal has its phase inverted at every line. Corresponding to this phase inversion, the phase of the color burst signal alternates between $+135°$ and $-135°$ at every line. Therefore, when a color burst signal of a reference color image signal is added to a PAL color image signal whose time base error has been corrected, it is necessary to invert the polarity of the V-axis signal component of the color subcarrier signal in accordance with the phase alternation between $+135°$ and $-135°$ of the color burst signal to be added to the color burst signal of the reference color image signal. For this purpose, the TBC for the PAL system is provided with a circuit for inverting the polarity of the color subcarrier signal in such a manner that it is coincident with the phase of the color burst signal of the reference color image signal. However, incorporating such a TBC in a VTR complicates the VTR circuitry.

OBJECTS AND SUMMARY OF THE INVENTION

An object of the present invention is to provide a time base corrector that corrects the time base error of a PAL color image signal while simplifying the circuitry for achieving coincidence between the polarity of V-axis data of the color burst of the color subcarrier and the polarity of the V-axis data of a reference color burst.

Another object of the invention is to provide a time base corrector that facilitates extraction of V-axis data of the color burst of the color subcarrier.

Another object of the invention is to provide a time base corrector of simple construction that extracts the V-axis data from the color burst and inverts the polarity thereof.

In accordance with one aspect of the invention, the foregoing and other objects are attained in a time base corrector comprising means for providing an analog input PAL image signal including a luminance signal and a color subcarrier signal having a color burst in odd-numbered and even-numbered lines and U-axis data and V-axis data; means for extracting the luminance signal from the analog input PAL image signal; first analog-to-digital converter means for converting the luminance signal to a first digital signal; memory means for storing the first digital signal; means for generating a first clock signal; memory controller means responsive to the first clock signal for generating a write clock signal controlling writing of the first digital signal into the memory means and for generating a reference readout signal controlling readout of the first digital signal from the memory means; means for adding a reference color burst signal having at least V-axis data to the first digital signal read out from the memory means; extracting means for extracting the color subcarrier signal from the analog input PAL image signal; sampling means for sampling the color subcarrier signal by the use of the first clock signal in a manner such that the U-axis data and the V-axis data of the color subcarrier signal are generated independently of each other; comparator means for comparing the polarity of the V-axis data of the color subcarrier signal with the polarity of the V-axis data of the reference color burst signal; and V-axis inverting means responsive to the comparator means for selectively inverting the polarity of the V-axis data of the color subcarrier signal; the write clock signal effecting storing in the memory means of the color subcarrier signal of which the V-axis data is selectively inverted by the inverter means.

These and other objects, features and advantages of the present invention will become apparent from the following detailed description of the preferred embodiment thereof taken in conjunction with the accompanying drawings, throughout which like reference numerals designate like elements and parts.

DESCRIPTION OF THE PREFERRED EMBODIMENT

Figure 1:
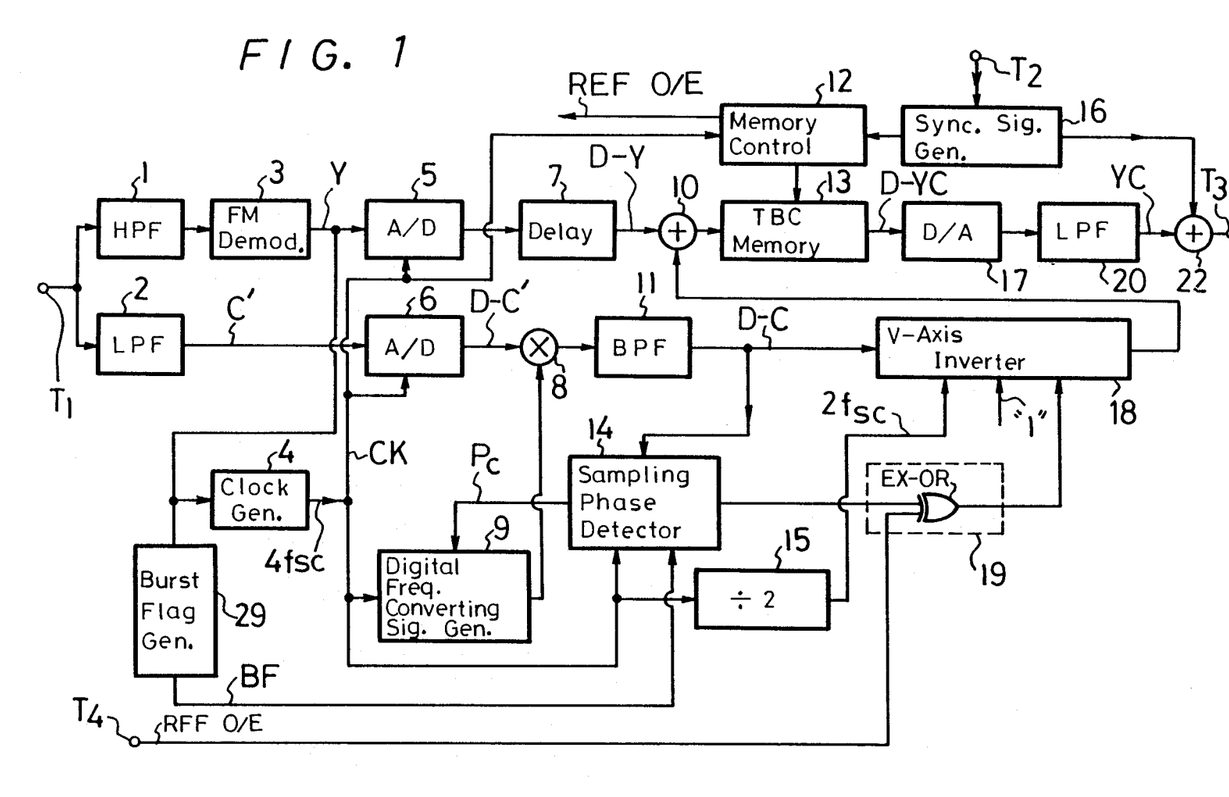
FIG. 1 is a circuit block diagram of a preferred embodiment of a time base corrector according to the present invention.

FIG. 1 shows an input terminal $T_1$ supplied with an analog PAL color image signal reproduced by a rotary head of a video tape recorder or VTR (the latter not shown). A color subcarrier signal is included in the reproduced color image signal. The reproduced color image signal is supplied to a high pass filter (HPF) 1 and a low pass filter (LPF) 2 wherein it is separated into an FM-modulated luminance signal and a low-band-converted color subcarrier signal C', respectively. The FM-modulated luminance signal is demodulated by an FM demodulating circuit 3, and the luminance signal (hereinafter sometimes referred to as the "Y signal") thus demodulated is supplied to a first analog-to-digital (A/D) converter 5, a clock generating circuit 4, and a burst flag forming circuit 29. The low-band-converted color subcarrier signal C' from the LPF 2 is supplied to a second A/D converter 6.

The first and second A/D converters 5 and 6 are supplied with a first clock signal CK generated by the clock generating circuit 4. The clock signal CK has a frequency of 4 fsc, which is four times greater than the frequency fsc of the color subcarrier signal. The color subcarrier signal is synchronized with a horizontal synchronizing signal (including jitter or time base error) of the Y signal. The A/D converters 5 and 6 respectively convert the demodulated luminance signal Y and the low-band-converted color subcarrier signal C' to digital signals. The luminance signal digitally converted by the first A/D converter 5 is supplied to a first adder circuit 10 through a delay circuit 7. The first adder circuit 10 is also supplied with a digital color subcarrier signal the phase of the V-axis component of which is controlled as described below. The adder 10 adds this modified digital color subcarrier signal to the digital luminance signal D-Y. The output of the first adder circuit 10, which represents this addition, is stored in a TBC memory circuit 13.

Writing a digital image signal into, and reading it out from, the TBC memory circuit 13 is controlled by a memory controller 12. The memory controller 12 is supplied with the first clock signal CK having the frequency of 4 fsc and with a synchronizing signal and a burst signal from a synchronizing signal generating circuit 16, which is supplied with an image signal (black burst) through an input terminal $T_2$. The digital image signal D-YC read out from the TBC memory circuit 13 is reconverted to an analog signal by a digital-to-analog (D/A) converter 17 and processed by an LPF 20 to derive the PAL color image signal YC which is then supplied to a second adder circuit 22 wherein the synchronizing signal and the burst signal from the synchronizing signal generating circuit 16 are added to the PAL color image signal YC. The PAL color image signal YC thus processed is supplied by the second adder circuit 22 to an output terminal $T_3$.

A digital frequency converting signal generating circuit 9 and a sampling phase detecting circuit 14 are both supplied with the first clock signal CK of 4 fsc from the clock generating circuit 4. The phase of the digital frequency converting signal from the digital frequency converting signal generating circuit 9 is controlled by a control signal $P_c$ supplied thereto from the sampling phase detecting circuit 14. The sampling phase detecting circuit 14 is also supplied with a burst flag signal BF formed by the burst flag forming circuit 29.

The low-band-converted digital color subcarrier signal D-C' produced by the second A/D converter 6 is supplied to a digital multiplying circuit 8 in which it is multiplied by the digital frequency converting signal produced by the digital frequency converting signal generating circuit 9. The output signal from the digital multiplying circuit 8 is supplied to a band pass filter (BPF) 11 whose central pass-band frequency is 4.43 MHz to produce thereby a high-band digital color subcarrier signal D-C of 4.43 MHz.

The digital color subcarrier signal D-C from the BPF 11 is supplied to the sampling phase detecting circuit 14 and a V-axis inverting circuit 18.

The sampling phase detecting circuit 14 detects whether the phase of a sampling point (angularly near the V-axis) of the color subcarrier signal D-C digitized by the clock signal CK of 4 fsc is coincident with the phases of the U-axis and V-axis or is leading or lagging with respect thereto by checking whether the addition of odd-numbered and even-numbered lines of the digital burst signal at the sampling point is zero, negative or positive. It is possible to determine whether a line is odd-numbered or even-numbered by detecting whether the sampling phase component of the digital burst signal near the V-axis is negative or positive.

A second output of the sampling phase detecting circuit 14 is supplied to an input terminal of an exclusive-OR gate 19. The other input terminal of the exclusive-OR gate 19 is supplied, through an input terminal $T_4$ (see also FIG. 2), with a discrimination reference signal REF O/E formed by the memory controller 12 for determining whether any given line is odd-numbered or even-numbered. The output of an exclusive OR gate is "1" if one input is "1" and the other is "0"; the output is "0" if both inputs are "0" or both inputs are "1". The exclusive-OR gate 19 thus functions as a comparator or discriminator for determining whether its two inputs are alike or different.

The clock signal CK of the frequency 4 fsc is supplied to a ½ frequency divider circuit 15, in which it is divided by two. The resulting clock signal having the frequency 2fsc is supplied to the V-axis inverting circuit 18. The V-axis inverting circuit 18 is also supplied with the output signal from the exclusive-OR gate 19 as a control signal. The digital color subcarrier signal D-C is selectively inverted with respect to its V-axis by the V-axis inverting circuit 18, and the digital color subcarrier signal formed of U, V, −U, −V or U, −V, −U, V . . . is supplied to the first adder circuit 10.

Figure 2:
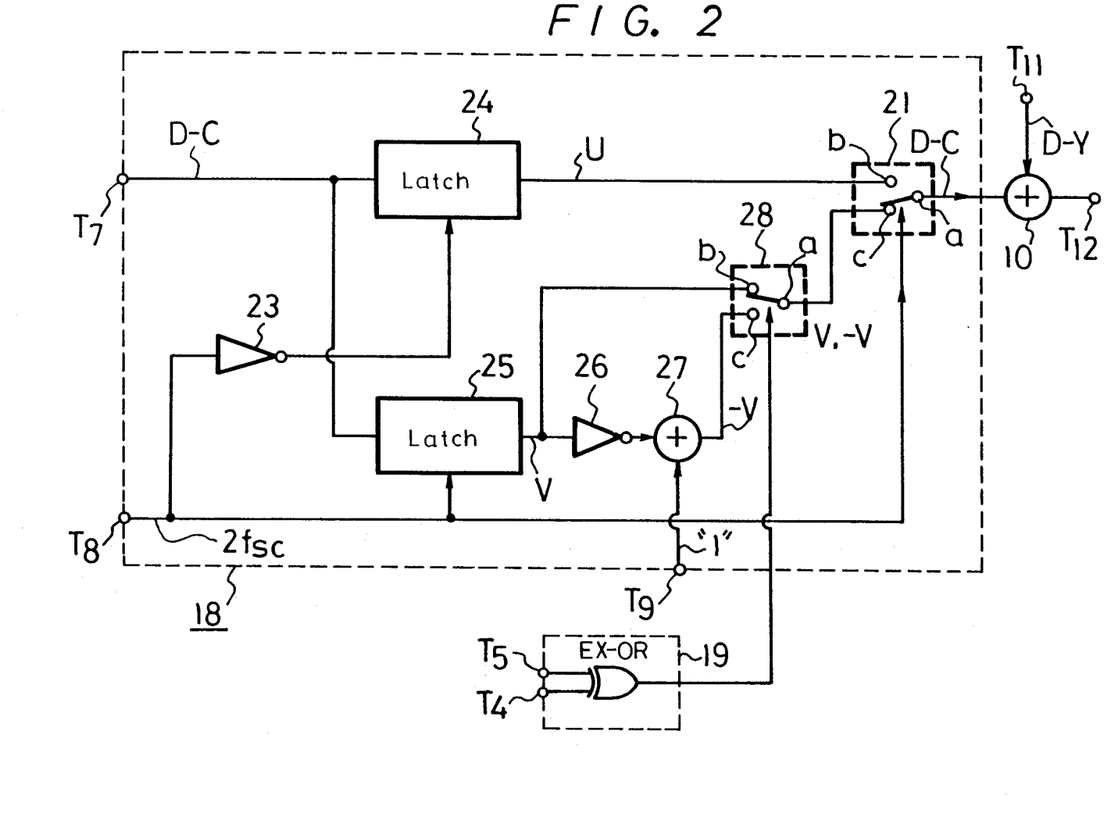
FIG. 2 is a circuit block diagram of a V-axis inverting circuit incorporated in the time base corrector of FIG. 1.

The V-axis inverting circuit 18 is explained in more detail with reference to FIG. 2. In FIG. 2, a terminal $T_7$ is supplied with the digital color subcarrier signal D-C from the BPF 11 (FIG. 1) whose carrier frequency is converted to 4.43 MHz. A terminal $T_8$ is supplied with the clock signal of the frequency 2fsc from the ½ frequency dividing circuit 15, and a terminal $T_9$ is supplied with a signal indicative of a value "1". The exclusive-OR gate 19 and the first adder circuit 10 function as explained in connection with FIG. 1. The first adder circuit 10 is supplied with the digital luminance signal D-Y from the delay circuit 7 through a terminal $T_{11}$ (FIG. 2) and supplies its output to the TBC memory circuit 13 (FIG. 1) through a terminal $T_{12}$.

The V-axis inverting circuit 18 (FIG. 2) includes first and second latch circuits 24 and 25 which are supplied with the digital color subcarrier signal D-C from the terminal $T_7$.

The first latch circuit 24 latches or extracts U-axis data by using an inverted clock signal of frequency 2 fsc. This signal is obtained from an inverter circuit 23 that inverts the clock signal supplied by the ½ frequency divider circuit 15 (FIG. 1). The latch circuit 24 supplies its latch output U to a fixed contact b of a first switching circuit 21.

The second latch circuit 25 latches (or extracts) V-axis data using the uninverted clock signal of 2 fsc supplied by the ½ frequency divider 15 (FIG. 1). Its latch output V is inverted by an inverter circuit 26 and then incremented by "1" by a third adder circuit 27. The resulting inverted V-axis data is supplied to a fixed contact c of a second switching circuit 28. A fixed contact b of the second switching circuit 28 is directly supplied with the uninverted output V of the second latch circuit 25. The second switching circuit 28 alternately outputs positive V-axis data and inverted V-axis data, namely V, −V, V, −V . . . , by changing over its movable contact a in response to the output from the exclusive-OR gate 19. Since the output of the second switching circuit 28 is supplied to a fixed contact c of the first switching circuit 21, the first switching circuit 21 supplies as its output a digital color subcarrier signal formed of U, V, −U, −V ... or U, −V, −U, V ... by changing over its movable contact a in response to the clock signal of 2fsc from the terminal T$_8$. The digital color subcarrier signal thus formed is supplied to the first adder circuit 10.

In the embodiment of the invention described above, the V-axis inversion is accomplished with a simple construction, thereby simplifying the circuitry of a VTR in which the time base corrector is incorporated.

The sampling phase detecting circuit 14 of FIG. 1 is described in detail with reference to FIGS. 3 to 6.

Figure 3:
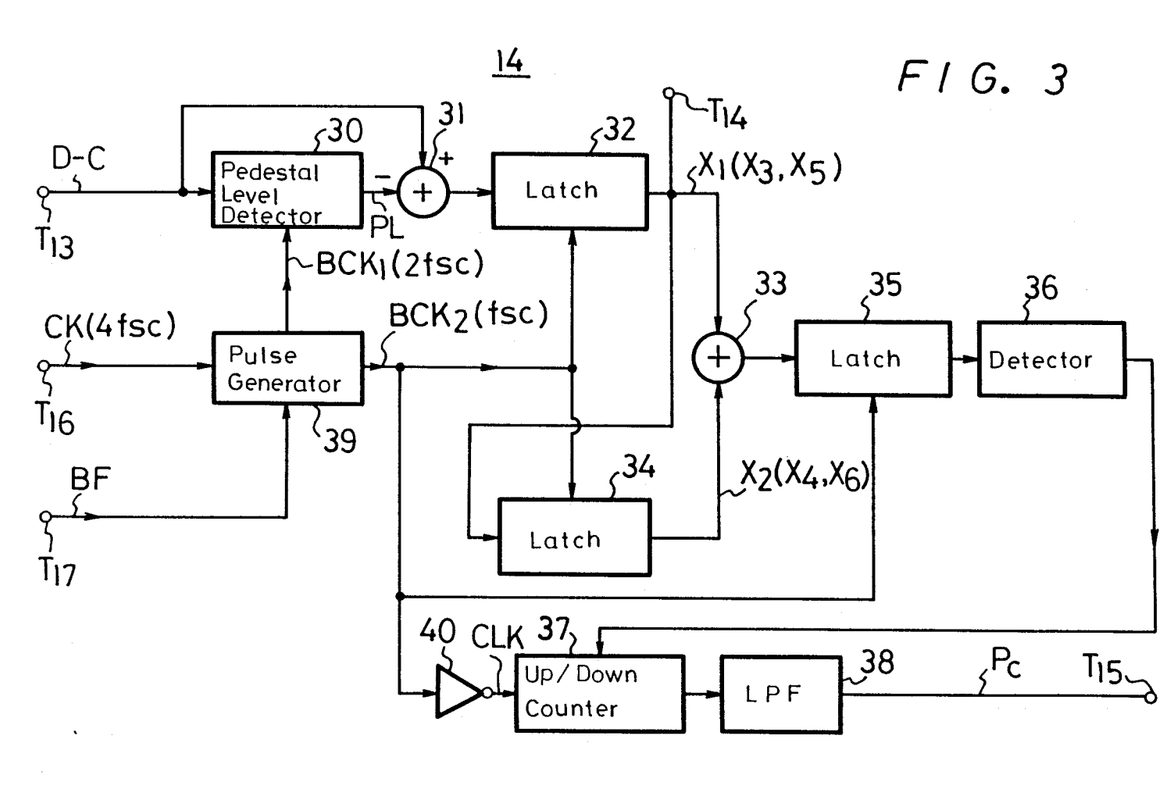
FIG. 3 is a circuit block diagram of a sampling phase detecting circuit incorporated in the time base corrector of FIG. 1.

FIG. 3 is an overall block diagram of the sampling phase detecting circuit 14.

The digital color subcarrier signal D-C received from the BPF 11 (FIG. 1) at a terminal T$_{13}$ (FIG. 3) of the sampling phase detecting circuit 14 is supplied to a pedestal level detecting circuit 30 and to a fourth adder circuit 31. The output of the pedestal level detecting circuit 30 is supplied to the fourth adder circuit 31 for subtraction from the digital color subcarrier signal D-C received from the BPF 11.

The output of the fourth adder circuit 31 is supplied to a third latch circuit 32, the output X$_1$, X$_3$ or X$_5$ (discussed below) of which is supplied to a fifth adder circuit 33, an output terminal T$_{14}$, and a fourth latch circuit 34. The signal at the terminal T$_{14}$ is supplied to the exclusive-OR gate 19. The output X$_2$, X$_4$ or X$_6$ (discussed below) of the fourth latch circuit 34 is supplied to the fifth adder circuit 33 to be added to the output of the third latch circuit 32. The output of the fifth adder circuit 33 is supplied to a fifth latch circuit 35.

The output of the fifth latch circuit 35 is supplied to a detecting circuit 36, the output of which is supplied to an up/down counter 37 as a control signal. The output of the up/down counter 37 is delivered as the phase control signal P$_c$ to an output terminal T$_{15}$ through an LPF 38.

The phase control signal P$_c$ delivered to the output terminal T$_{15}$ is supplied to the digital frequency converting signal generating circuit 9 shown in FIG. 1 for controlling the phase of the digital signal supplied as an output by the digital frequency converting signal generating circuit 9 in such a manner that, measured at the sampling point, the phase of the digital color subcarrier signal at the output of the digital multiplying circuit 8 is coincident with the phase of the U-axis or V-axis.

FIG. 3 further shows an input terminal T$_{16}$ supplied with the first clock signal CK of frequency 4 fsc from the clock generating circuit 4 shown in FIG. 1. The clock signal CK is supplied to a pulse generating circuit 39 which is also supplied with the burst flag signal BF from the burst flag forming circuit 29 (FIG. 1) through an input terminal T$_{17}$. The output BCK$_1$ of the pulse generating circuit 39 is supplied to the pedestal level detecting circuit 30. The output BCK$_2$ of the pulse generating circuit 39 is supplied to the third to fifth latch circuits 32, 34 and 35 and to the up/down counter 37 at its clock terminal CLK through an inverter circuit 40.

An understanding of the PAL color image signal will facilitate an understanding of the operation of the circuit described above.

The PAL color image signal is represented by the following equation:

$$E_Y' + \frac{E_B' - E_Y'}{2.03} \sin \omega_{sc} t \pm \frac{E_R' - E_Y'}{1.14} \cos \omega_{sc} t \quad (1)$$

where $\omega_{sc}$ represents the color subcarrier angular frequency.

The following replacements may be made for simplicity:

$$E_u' = \frac{E_B' - E_Y'}{2.03} \quad (2)$$

$$E_v' = \frac{E_R' - E_Y'}{1.14} \quad (3)$$

A color subcarrier with a phase of 90° is subjected to balanced modulation by $E_u'$, and a color subcarrier whose phase alternates between 0° and 180° at every line is subjected to balanced modulation by $E_v'$. The two modulated signals are added to each other to generate a color subcarrier signal. The color subcarrier frequency fsc is offset by ¼ line from $f_H$ and represented by the following equation:

$$f_{sc} = (284 - \tfrac{1}{4})f_H + f_H/625 \quad (4)$$

The addition of $f_H/625$ (=25 Hz) in equation (4) is a correction for removing dot interference caused by the color subcarrier in the reproduced image. The phase of the color burst signal alternates between +135° and −135° with respect to the U-axis at every line.

FIGS. 4A to 4D show waveforms of color burst signals of the above-mentioned PAL color subcarrier signal.

Figure 4A:
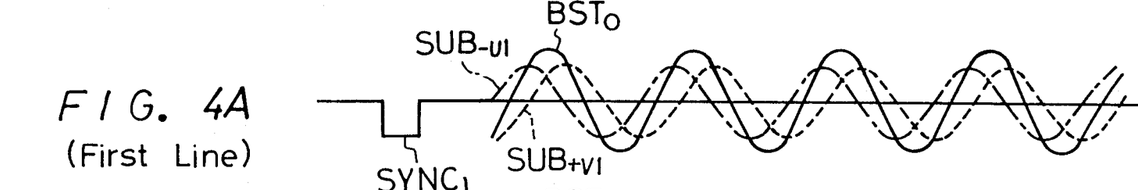
FIGS. 4A to 4D are charts showing waveforms of the color burst of the PAL color image signal in four successive lines.
Figures 4B, 4C, 4D:
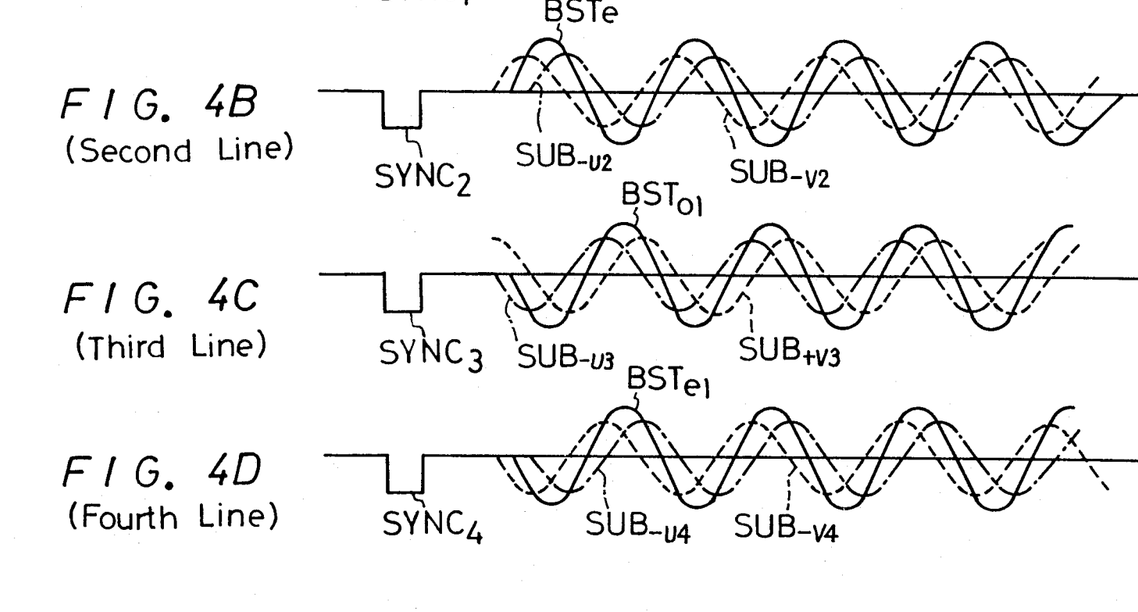

FIG. 4A shows a waveform of a color burst signal BST$_o$ on a first line which is synthesized by color subcarrier signals SUB$_{-u1}$ and SUB$_{+v1}$ whose phases are coincident with those of the −U-axis and +V-axis, respectively. FIG. 4B shows a color burst signal BST$_e$ on a second line (following the first line), synthesized by color subcarrier signals SUB$_{-u2}$ and SUB$_{-v2}$ whose phases are coincident with the −U-axis and −V-axis which are shifted by 90° from the −U-axis and +V-axis on the first line. FIG. 4C shows a color burst signal BST$_{o1}$ on a third line (following the second line), synthesized by color subcarrier signals SUB$_{-u3}$ and SUB$_{+v3}$ whose phases are coincident with the −U-axis and +V-axis which are shifted by 180° from the −U-axis and +V-axis on the first line. FIG. 4D shows a fourth color burst signal BST$_{e1}$ on a fourth line (following the third line), synthesized by color subcarrier signals SUB$_{-u4}$ and SUB$_{-v4}$ whose phases are coincident with the −U-axis and −V-axis which are shifted by 270° from the −U-axis and +V-axis on the first line. SYNC$_1$ to SYNC$_4$ in FIGS. 4A to 4D designate horizontal synchronizing signals. After the first to fourth color burst signals BST$_o$, BST$_e$, BST$_{o1}$ and BST$_{e1}$ circulate once, they appear again and again in the same sequence beginning with the fifth line.

Figure 5A:
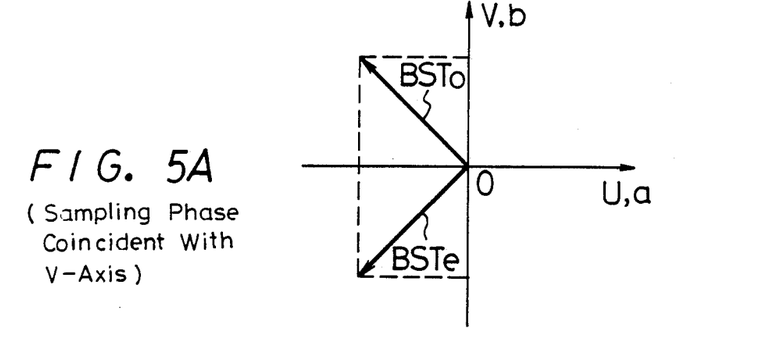
FIGS. 5A to 5C are diagrams respectively showing the relationship between the phase of a sampling clock and the U- and V-axes of the PAL, color image signal.
Figure 5B:
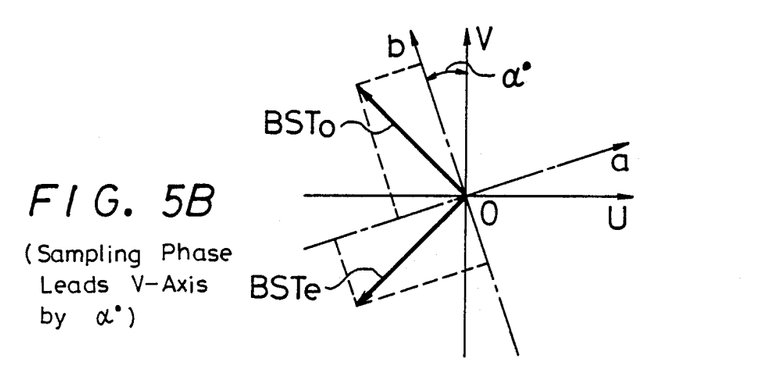
Figure 5C:
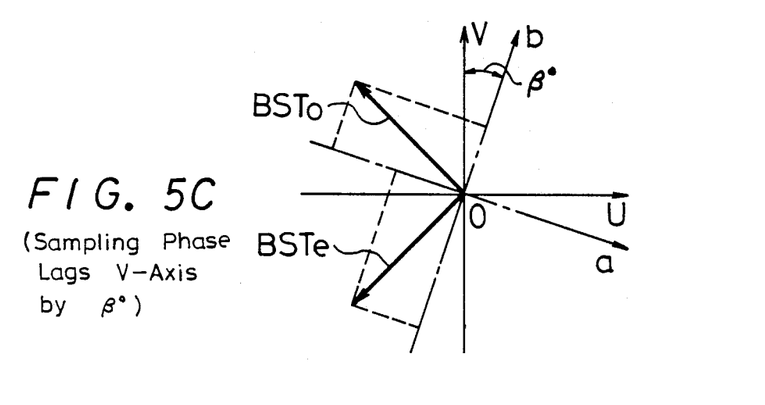

When the PAL color image signal as described above is sampled at a frequency four times the frequency fsc of the color subcarrier signal, that is, at a frequency of 4 fsc, the level and phase of the burst signal corresponding to the degree of deviation in the sampling phase with respect to the U- and V-axes can be represented as in FIGS. 5A, 5B and 5C.

In FIGS. 5A, 5B and 5C, reference letters a and b designate sampling axes (phases) having a phase difference of 90° with respect to each other. FIG. 5A shows a case where the sampling axes a and b are coincident with the U- and V-axes, respectively; FIG. 5B shows a case where they lead by α° with respect to the U- and V-axes; and FIG. 5C shows a case where they lag by β° with respect to the U- and V-axes. Reference letters $BST_o$ and $BST_e$ appearing in FIGS. 5A–5C designate vectors representing burst signals in odd-numbered and even-numbered lines and respectively having phases of +135° and −135° with respect to the U-axis.

In FIG. 5A, where the sampling axes a and b are respectively coincident with the U- and V-axes, the resolved vectors (vector components) of the vectors representing the burst signals $BST_o$ and $BST_e$ on the sampling axis a have the same magnitude and the same direction, while the resolved vectors thereof on the sampling axis b have the same magnitude but directions opposite to each other.

In the case where the sampling axes a and b lead by α° with respect to the U- and V-axes as shown in FIG. 5B, as to the resolved vectors or components of the vectors representing the burst signals $BST_o$ and $BST_e$ on the sampling axis a, the former is smaller than the latter in magnitude and both are the same in direction, while as to the resolved vectors thereof on the sampling axis b, the former is larger than the latter in magnitude and the directions thereof are opposite to each other.

When the sampling axes a and b lag by ° with respect to the U- and V-axes, as shown in FIG. 5C, as to the resolved vectors of the vectors representing the burst signals $BST_o$ and $BST_e$ on the sampling axis a, the former is larger than the latter in magnitude and the both are in the same direction, whereas, as to the resolved vectors thereof on the sampling axis b, the former is smaller than the latter in magnitude, and they are in directions opposite to each other.

It will be understood from FIGS. 5A to 5C that it can be detected whether the sampling phase is coincident with, leads, or lags with respect to the phase of the U- and V-axes by detecting the magnitude and the phase of the components of the burst signal BST ($BST_o$, $BST_e$) on the sampling axis b which has a phase angularly close to that of the V-axis.

It is also possible to detect whether or not the sampling phase is coincident with the phase of the U- and V-axes by detecting the magnitude and the phase of the components of the burst signal BST ($BST_o$ and $BST_e$) on the sampling axis a which has a phase close to that of the U-axis. However, lead and lag in phase cannot be detected in the latter case.

Figures 6A, 6C:
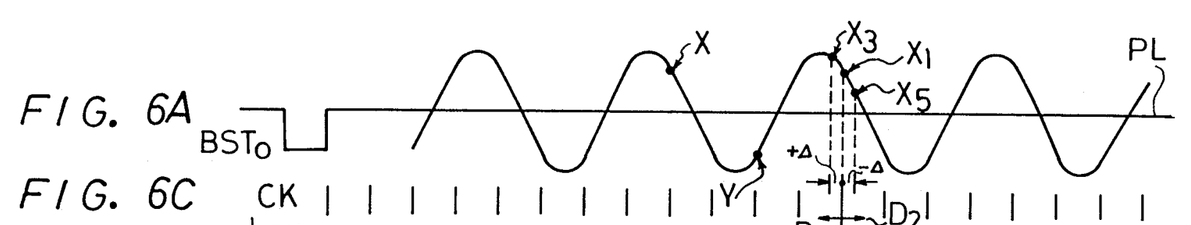
FIGS. 6A, 6B, 6C to 6F, and 6C' to 6F' are timing charts used for explaining the operation of the sampling phase detecting circuit of the present invention.
Figures 6B, 6C, 6F:
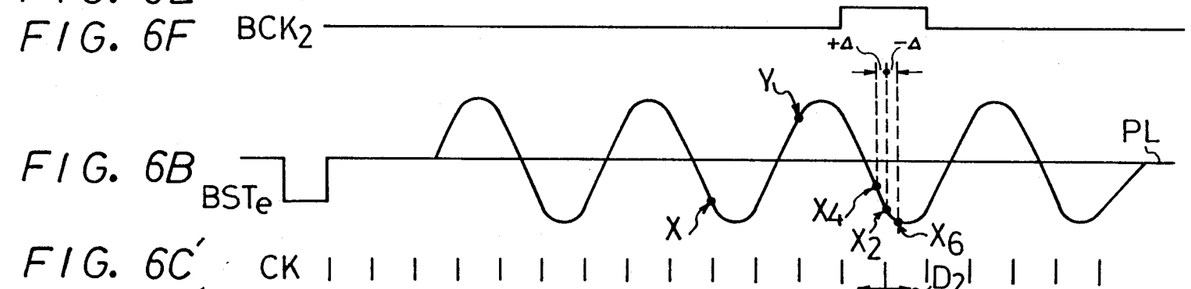
Figure 6D:
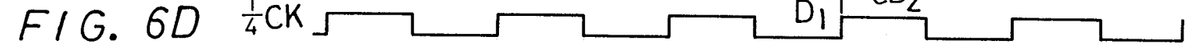
Figure 6E:
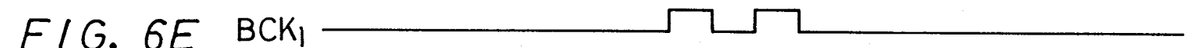
Figure 6F:
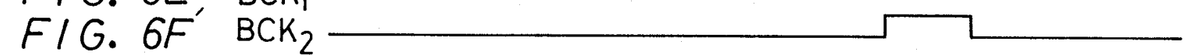

FIGS. 6A and 6B show the operation of the sampling phase detecting circuit 14, which compares the magnitude of a high-band-converted color burst signal supplied by the digital multiplier circuit 8 during odd-numbered and even-numbered lines and detects the phase difference between that signal and the sampling clock formed by the clock generating circuit 4.

The input terminal $T_{13}$ (FIG. 3) of the sampling phase detecting circuit 14 (FIGS. 1 and 3) is supplied with a high-band-converted digital color subcarrier signal D-C filtered by the BPF 11 (FIG. 1). FIGS. 6A and 6B show waveforms of PAL color burst signals $BST_o$ and $BST_e$ in first and second lines supplied to the input terminal $T_{13}$. In practice, these signals have been converted to digital signals by the A/D converter 6 and converted to a high band by the digital mutliplier 8; however, analog burst signals are illustrated in FIGS. 6A and 6B for ease of understanding. FIG. 6C show the sampling clock signal (first clock signal) CK formed by the clock generating circuit 4 and having the frequency of 4 fsc, which is supplied to the input terminal $T_{16}$ of FIG. 3.

The digital color subcarrier signal D-C received at terminal $T_{13}$ of the sampling phase detecting circuit 14 is supplied to the pedestal level detecting circuit 30 and to the fourth adder circuit 31.

The clock signal CK of frequency 4 fsc formed by the clock generating circuit 4 is supplied to the pulse generating circuit 39 by way of the input terminal $T_{16}$. The pulse generating circuit 39 generates a rectangular wave CK/4 (FIGS. 6D and 6D') by frequency-dividing the clock signal CK by four. As FIGS. 6D and 6D' show, the signal CK/4 has a phase lag of 90° with respect to the horizontal synchronizing signal at every line. Within a predetermined period in which the pulse generating circuit 39 (FIG. 3) is supplied with the burst flag signal BF through the input terminal $T_{17}$, it generates twice the clock signal $BCK_1$ (FIGS. 6E and 6E') having a frequency of 2fsc for extracting data components of a digital burst signal on the sampling axis b angularly near the V-axis, and supplying the extracted data components to the pedestal level detecting circuit 30. Further, the latch circuits 32, 34 and 35 are supplied with a clock signal $BCK_2$ (FIGS. 6F and 6F') having a frequency of fsc generated from the rectangular signal CK/4. In response to the signal $BCK_2$, the latch circuits 32, 34 and 35 latch the digital burst signal. The signal $BCK_2$ is inverted in phase by the inverter circuit 40 and supplied to the up/down counter 37 at its clock terminal.

The pedestal level detecting circuit 30 operates as follows. Since the sampling frequency of the clock signal CK (FIGS. 6C and 6C') is 4 fsc, data X and Y (shown in FIGS. 6A and 6B) obtained by sampling the burst signal at every other clock signal are vertically symmetrically positioned with respect to a pedestal level PL. Therefore, the pedestal level (a digital value) PL can be obtained by taking out the data X and Y at the rising edge of the clock signal $BCK_1$ and calculating the average value (X+Y)/2 in the pedestal level detecting circuit 30. The pedestal level thus obtained is latched for a predetermined time and then supplied to the fourth adder circuit 31. The fourth adder circuit 31 subtracts the pedestal level PL from the digital burst signal level D-C passed by the BPF 11. The output of the adder circuit 31 is supplied to the third latch circuit 32 and latched thereby at the rising edge of the clock signal $BCK_2$ in order to detect digital level data including the positive or negative polarity of the sampling phase (the axis b in FIGS. 5A–5C) of the digital burst signal angularly near the V-axis. FIG. 6A shows a typical value $X_1$ of the burst signal in an odd-numbered line of the V-axis latched (extracted) by the clock signal $BCK_2$ (in practice, as indicated above, it takes a digital value).

By the same process as that described above, the level data of the next digital burst signal is latched by the third latch circuit 32. In this case, the data of the digital burst signal in the preceding line has been latched by the fourth latch circuit 34 in response to the clock signal $BCK_2$. The level data of the digital burst signal in the next line, which in the PAL system is an even-numbered line with a phase difference of 90° with respect to the odd-numbered line, is shown at $X_2$ in FIG. 6B (in practice, it takes a digital value).

The data $X_1$ and $X_2$ taken from adjacent odd and even lines are added to each other in the fifth adder circuit 33

(FIG. 3). If $X_1$ is equal in absolute value to $X_2$, the output of the fifth adder circuit 33 is zero, which means that the sampling axis b is coincident with the V-axis, as shown in FIG. 5A. When the phase of the sampling clock signal CK shown in FIGS. 6C and 6C' deviates by $\Delta$ in the direction of an arrow $D_1$ in FIGS. 6C and 6C', the positions of the data $X_1$ and $X_2$ are moved to those of the data $X_3$ and $X_4$, respectively, and the added value in the fifth adder circuit 33 becomes positive, which means that the sampling axis b deviates by $\alpha°$ counterclockwise from the V-axis as shown in FIG. 5B.

When the phase of the sampling clock signal CK shown in FIGS. 6C and 6C' deviates by $-\Delta$ in the direction of an arrow $D_2$ in FIGS. 6C and 6C', the positions of data $X_1$ and $X_2$ are moved to those of the data $X_5$ and $X_6$, respectively, and the added value in the fifth adder circuit 33 becomes negative, which means that the sampling axis b deviates by $\beta°$ clockwise from the V-axis as shown in FIG. 5C.

The output of the fifth adder circuit 33 is latched in the fifth latch circuit 35 by the clock signal $BCK_2$. The detecting circuit 36 detects whether the aforementioned addition shows a positive value, a negative value or zero by the use of the output from the fifth latch circuit 35. If it is detected that the addition result is positive or negative, the detecting circuit 36 supplies to the up/down counter 37 a control signal for correcting the phase of the sampling clock signal CK in such a manner that the addition of the data $X_1$ and $X_2$ becomes zero; that is, the phase of the digital frequency converting signal is shifted by $\Delta$ in the negative direction if the addition shows a positive value, and by $\Delta$ in the positive direction if the addition shows a negative value.

The up/down counter 37 is controlled to be changeably set into one of non-counting, up-counting and down-counting modes on the basis of the control signal from the detecting circuit 36. The counted value is digitally supplied to the LPF 38 and next supplied to the digital frequency converting signal generating circuit 9 (FIG. 1) as a feedback signal $P_c$ corresponding to a lead or a lag in phase of the sampling point to be used for the phase adjustment.

The time base corrector of the present invention constructed as described above can detect a difference in phase between the sampling signal and the color burst signal of the PAL color image signal by merely comparing the magnitudes of the color burst signals in odd-numbered and even-numbered lines, thereby to provide a simple and highly accurate phase detecting circuit.

While a single preferred embodiment of the invention is described above, it is apparent that many modifications and variations can be effected by one skilled in the art without departing from the spirit or scope of the invention. The scope of the invention is therefore determined only by the appended claims.

I claim:

1. A time base corrector comprising:
   means for providing an analog input PAL image signal including a luminance signal and a color subcarrier signal having a color burst in odd-numbered and even-numbered lines and U-axis data and V-axis data;
   means for extracting said luminance signal from said analog input PAL image signal;
   first analog-to-digital converter means for converting said luminance signal to a first digital signal;
   memory means for storing said first digital signal;
   means for generating a first clock signal;
   memory controller means responsive to said first clock signal for generating a write clock signal controlling writing of said first digital signal into said memory means and for generating a reference readout signal controlling readout of said first digital signal from said memory means;
   means for adding a reference color burst signal having at least V-axis data to said first digital signal read out from said memory means;
   extracting means for extracting said color subcarrier signal from said analog input PAL image signal;
   sampling means for sampling said color subcarrier signal by the use of said first clock signal in a manner such that said U-axis data and said V-axis data of said color subcarrier signal are generated independently of each other;
   comparator means for comparing the polarity of said V-axis data of said color subcarrier signal with the polarity of said V-axis data of said reference color burst signal; and
   V-axis inverting means responsive to said comparator means for selectively inverting the polarity of said V-axis data of said color subcarrier signal;
   said write clock signal effecting storing in said memory means of said color subcarrier signal of which said V-axis data is selectively inverted by said inverter means.

2. A time base corrector as claimed in claim 1, wherein said sampling means comprises:
   second analog-to-digital converter means for converting said extracted color subcarrier signal into a second digital signal;
   digital frequency converting signal generating means responsive to said first clock signal for generating a frequency converting signal; and
   digital multiplier means for multiplying said second digital signal by said frequency converting signal.

3. A time base corrector as claimed in claim 1, wherein said sampling means comprises phase detecting means for detecting the phase difference between the first clock signal and the V-axis by comparing the magnitude of the color burst signal in an odd-numbered line with the magnitude of the color burst signal in an even-numbered line.

4. A time base corrector as claimed in claim 1, wherein said sampling means comprises:
   second analog-to-digital converter means for converting said extracted color subcarrier signal into a second digital signal;
   digital frequency converting signal generating means responsive to said first clock signal for generating a frequency converting signal;
   digital multiplier means for multiplying said second digital signal by said frequency converting signal; and
   phase detecting means for detecting the phase difference between said first clock signal and the V-axis by comparing the magnitude of the color burst signal in one of said odd-numbered lines sampled by said first clock signal with the magnitude of the color burst signal in one of said even-numbered lines and producing a control signal;
   said frequency converting signal generating means being controlled by said control signal.

5. A time base corrector as claimed in claim 1, further comprising frequency dividing means for frequency-dividing said first clock signal by two to form a second clock signal; and wherein said V-axis inverting means comprises latch means for extracting said V-axis data from said color subcarrier signal on the basis of said second clock signal; and data inverting means for selectively inverting the polarity of the V-axis data of the color carrier signal extracted by said latch means.

* * * * *